US012734914B2

(12) United States Patent
Liu et al.

(10) Patent No.: US 12,734,914 B2
(45) Date of Patent: Sep. 15, 2026

(54) CHARGING CONTROL METHOD AND DEVICE FOR HYBRID ELECTRIC VEHICLE AND VEHICLE

(71) Applicant: BYD COMPANY LIMITED, Shenzhen (CN)

(72) Inventors: Weidong Liu, Shenzhen (CN); Chao Wang, Shenzhen (CN); Xinghui Wang, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 793 days.

(21) Appl. No.: 18/121,943

(22) Filed: Mar. 15, 2023

(65) Prior Publication Data

US 2023/0226933 A1 Jul. 20, 2023

Related U.S. Application Data

(63) Continuation of application No. PCT/CN2021/118564, filed on Sep. 15, 2021.

(30) Foreign Application Priority Data

Sep. 29, 2020 (CN) ........................ 202011056385.5

(51) Int. Cl.
*H02J 7/00* (2026.01)
*B60L 53/18* (2019.01)
(Continued)

(52) U.S. Cl.
CPC ............... *B60L 53/18* (2019.02); *B60L 58/18* (2019.02); *B60L 2210/10* (2013.01); *B60L 2240/547* (2013.01); *B60L 2240/549* (2013.01)

(58) Field of Classification Search
CPC ...... B60L 53/18; B60L 58/18; B60L 2210/10; B60L 2240/547; B60L 2240/549
(Continued)

(56) References Cited

U.S. PATENT DOCUMENTS 9,178,379 B2 * 11/2015 Choi .................. H02J 7/00309
2010/0259219 A1 * 10/2010 Kurimoto ............ H01M 10/44 320/109
(Continued)

FOREIGN PATENT DOCUMENTS

CN 103138334 A 6/2013
CN 104852418 A 8/2015
(Continued)

OTHER PUBLICATIONS

International Search Report and Written Opinion for Application No. PCT/CN2021/118564, mailed on Dec. 14, 2021, 8 pages.
(Continued)

*Primary Examiner* — Alexis B Pacheco
(74) *Attorney, Agent, or Firm* — Sheppard Mullin Richter & Hampton LLP

(57) ABSTRACT

A method for charging control of a hybrid electric vehicle, includes: receiving a charging instruction; acquiring a first voltage of a power battery and a second voltage of a storage battery in response to receiving the charging instruction; in response to determining that the first voltage is less than the first voltage threshold and the second voltage is less than the second voltage threshold, disconnecting the OBC from the power battery and charging the storage battery through the OBC and the DC for a charging duration; and in response to that the charging duration of the storage battery reaches a duration threshold, connecting the OBC to the power battery and charging the power battery through the OBC.

17 Claims, 4 Drawing Sheets

(51) Int. Cl.
*B60L 58/18* (2019.01)
*H02J 7/14* (2006.01)

(58) Field of Classification Search
USPC .......................................................... 320/109
See application file for complete search history.

(56) References Cited

U.S. PATENT DOCUMENTS

| | | | | |
|---|---|---|---|---|
| 2012/0016547 | A1* | 1/2012 | Aridome | B60L 58/14 180/65.265 |
| 2012/0169281 | A1* | 7/2012 | Itagaki | H02J 7/0013 320/109 |
| 2013/0134908 | A1* | 5/2013 | Sugiyama | H02J 7/342 320/162 |
| 2013/0297129 | A1* | 11/2013 | Ang | B60W 10/26 180/65.265 |
| 2014/0028256 | A1* | 1/2014 | Sugiyama | B60L 53/22 320/109 |
| 2014/0159478 | A1* | 6/2014 | Ang | B60L 1/003 307/9.1 |
| 2015/0097527 | A1* | 4/2015 | DeDona | B60L 50/16 320/109 |
| 2016/0311426 | A1* | 10/2016 | Sato | B60L 15/08 |
| 2018/0072180 | A1* | 3/2018 | Wu | H02J 7/0049 |
| 2019/0202300 | A1 | 7/2019 | Pastor et al. | |
| 2019/0366852 | A1* | 12/2019 | Zhang | H02J 7/02 |
| 2020/0185936 | A1* | 6/2020 | Oishi | H02J 7/0024 |
| 2020/0274385 | A1 | 8/2020 | Saito | |
| 2022/0024438 | A1* | 1/2022 | Vuylsteke | B60W 10/06 |
| 2022/0089143 | A1* | 3/2022 | Bryan | B60W 50/14 |

FOREIGN PATENT DOCUMENTS

| | | | |
|---|---|---|---|
| CN | 106340916 | A | 1/2017 |
| CN | 107089166 | A | 8/2017 |
| CN | 107994631 | A | 5/2018 |
| CN | 111038333 | A | 4/2020 |
| CN | 111371160 | A | 7/2020 |
| CN | 111376757 | A | 7/2020 |
| EP | 2228882 | A2 | 9/2010 |
| JP | 2010263683 | A | 11/2010 |
| JP | 2011072069 | A | 4/2011 |
| JP | 2014-135846 | A | 7/2014 |

OTHER PUBLICATIONS

Escudero et al., "Modulation Scheme for the Bidirectional Operation of the Phase-Shift Full-Bridge Power Converter", IEEE Transactions on Power Electronics, Feb. 2020, vol. 35, No. 2, pp. 1377-1391.

* cited by examiner

CHARGING CONTROL METHOD AND DEVICE FOR HYBRID ELECTRIC VEHICLE AND VEHICLE

CROSS-REFERENCE TO RELATED APPLICATIONS

This application is a Continuation Application of International Patent Application No. PCT/CN2021/118564, filed on Sep. 15, 2021, which is based on and claims priority to and benefits of Chinese Patent Application No. 202011056385.5, filed on Sep. 29, 2020. The entire content of all of the above applications is incorporated herein by reference.

FIELD

The present disclosure belongs to the field of electronic technologies, and more specifically, to a charging control method and device for a hybrid electric vehicle and a vehicle.

BACKGROUND

Currently, when a hybrid electric vehicle is charged, it directly charges a power battery and supplies power to a storage battery by the power battery.

However, when voltages of the power battery and the storage battery are both low, based on a protection principle that the power battery cannot discharge excessively, a DC-DC converter (DC) of the hybrid electric vehicle is not started, and the power battery does not supply power to the storage battery. Therefore, the storage battery may not satisfy power demands of most of the low-voltage loads, which may lead to the failure of some functions of the vehicle, and may even cause the vehicle to break down.

SUMMARY

The present disclosure resolves at least one of technical problems existing in the related art. A first aspect of the present disclosure provides a method for charging control of a hybrid electric vehicle. The method includes first charging a storage battery for a preset duration, and then charging a power battery to avoid the failure of a vehicle function and even avoid breakdown of the vehicle.

A second aspect of the present disclosure provides a device for charging control of a hybrid electric vehicle.

A third aspect of the present disclosure provides a vehicle.

In order to resolve the above problem, according to the method for charging control of a hybrid electric vehicle provided in an embodiment of the first aspect of the present disclosure, the hybrid electric vehicle includes a charging port, an On Board Charger (OBC), a power battery, a DC, and a storage battery. A first end of the OBC is connected with the charging port, a second end of the OBC is connected with a first end of the power battery and a first end of the DC, and a second end of the DC is connected with the storage battery. The charging control method includes: receiving a charging instruction; acquiring a first voltage of the power battery and a second voltage of the storage battery in response to receiving the charging instruction; determining whether the first voltage is less than a first voltage threshold or the second voltage is less than a second voltage threshold; in response to determining that the first voltage is less than the first voltage threshold and the second voltage is less than the second voltage threshold, disconnecting the OBC from the power battery and charging the storage battery through the OBC and the DC for a charging duration; and in response to that the charging duration of the storage battery reaches a duration threshold, connecting the OBC to the power battery and charging the power battery through the OBC.

In order to resolve the above problem, the device for charging control of a hybrid electric vehicle provided in an embodiment of the second aspect of the present disclosure includes: a processor; and a memory, where the memory is configured to store a computer program, and the computer program is executable by the processor to perform operations. The operations include: receiving a charging instruction; acquiring a first voltage of a power battery and a second voltage of a storage battery in response to receiving the charging instruction; in response to determining that the first voltage is less than the first voltage threshold and the second voltage is less than the second voltage threshold, disconnecting the OBC from the power battery and charging the storage battery through the OBC and the DC for a charging duration; and in response to that the charging duration of the storage battery reaches a duration threshold, connecting the OBC to the power battery and charging the power battery through the OBC.

In order to resolve the above problem, a vehicle provided in an embodiment of the third aspect of the present disclosure includes the device for charging control of a hybrid electric vehicle described above.

Compared with the related art, according to the present disclosure, when both the voltages of the power battery and the storage battery are low, the storage battery is first charged for a preset duration, and then the power battery is charged. Therefore, the storage battery can quickly reach a preset voltage, so as to quickly respond to the power demands of all low-voltage loads, which avoids a failure of some functions of the vehicle or even break-down of the vehicle as a result of a start failure caused by the low-voltage loads due to the insufficient power supply voltage of the storage battery, thereby improving the functional safety of the vehicle control.

Some of the additional aspects and advantages of the present disclosure are to be given in the following description, and some will become apparent in the following description, or may be learned by practice of the present disclosure.

BRIEF DESCRIPTION OF THE DRAWINGS

The foregoing and/or additional aspects and advantages of the present disclosure will become apparent and easy to understand in the description of the embodiments made with reference to the following accompanying drawings.

DETAILED DESCRIPTION

The embodiments of the present disclosure are described in detail below, and the embodiments described with reference to accompanying drawings are exemplary.

Figure 1:
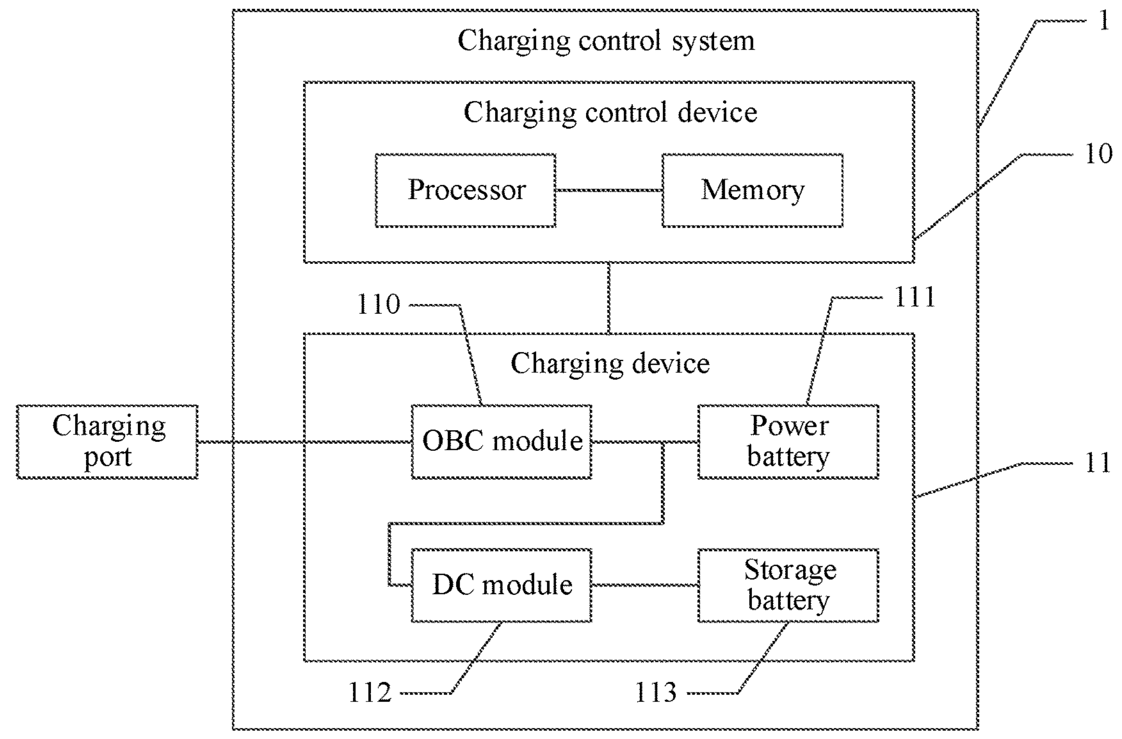
FIG. 1 is a schematic diagram of a structure of a charging control system in the method according to an embodiment of the present disclosure.

The charging control method provided in the present disclosure may be applied to charging control of a hybrid electric vehicle, and may be implemented in a charging control system 1 shown in FIG. 1. The charging control system 1 includes a charging control device 10 and a charging device 11. The charging control device 10 is connected with the charging device 11. The charge control device 10 includes a processor and a memory that are connected with each other. The charging device 11 includes an OBC 110, a DC 112, a power battery 111, and a storage battery 113. One end (e.g., a first end) of the OBC 110 is externally connected with a charging port, another end (e.g., a second end) of the OBC 110 is connected with one end (e.g., a first end) of the power battery 111 and one end (e.g., a first end) of the DC 112, and another end (e.g., a second end) of the DC 112 is connected with the storage battery 113.

Figure 2:
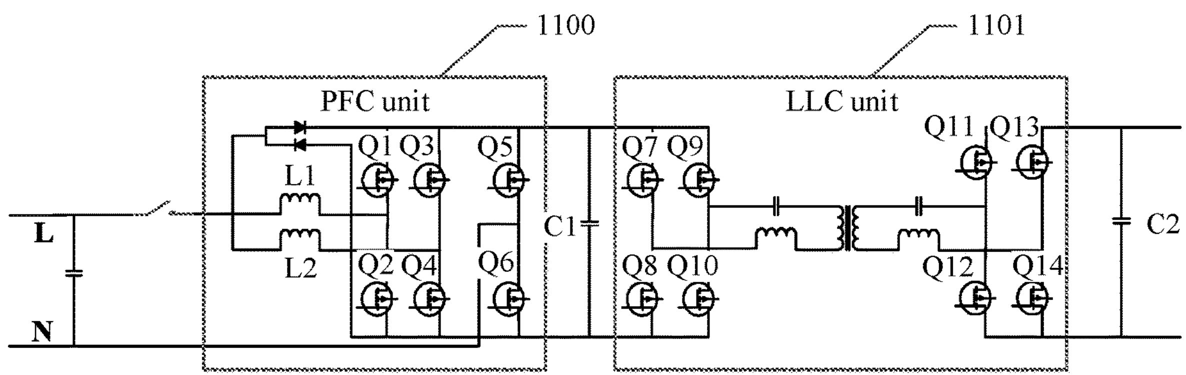
FIG. 2 is a schematic diagram of an OBC according to an embodiment of the present disclosure.

Based on this embodiment, in other embodiments, as shown in FIG. 2, the OBC 110 includes a Power Factor Correction (PFC) circuit 1100, a first capacitor C1, an LLC resonant converter (LLC) 1101, and a second capacitor C2 connected in sequence. The PFC circuit 1100 is connected with the charging port, and the second capacitor C2 is connected with a precharge circuit 120 and the DC 112.

The charging control device 10 is a processing device of the charging control system 1, which is configured to receive parameter information collected by a related component in the charging device 11, perform analysis according to the parameter information, and control switch transistors in the OBC 110 and the DC 112 according to an analysis result, so as to realize charging control of the power battery 111 and the storage battery 113. It should be noted that the charging control device 10 in this embodiment may be a controller or a control chip.

Figure 3:
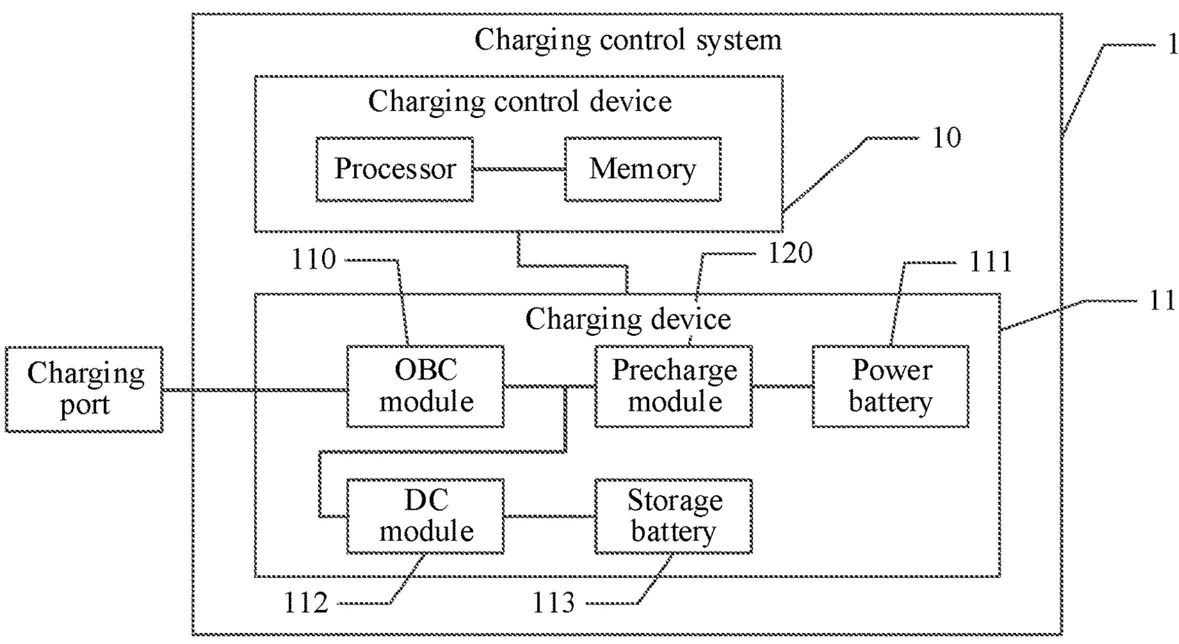
FIG. 3 is a schematic diagram of a structure of a charging control system in the method according to another embodiment of the present disclosure.

In some embodiments, as shown in FIG. 3, the charging control system 1 further includes a precharge circuit/circuit 120. One end (e.g., a second end) of the precharge circuit 120 is connected with the power battery 111, and another end (e.g., a first end) of the precharge circuit 120 is connected with the OBC 110 and the DC 112. The precharge circuit 120 is configured to realize the connection/disconnection between the OBC 110 and the power battery 111, and realize precharging of the power battery 111.

In some embodiments, the precharge circuit 120 includes a first switch, a second switch, and a precharge resistor. The second switch and the precharge resistor are connected in series, and the second switch and the precharge resistor connected in series are connected in parallel with the first switch.

The above hardware structures may be used to implement the charging control method of the present disclosure. However, it should be noted that the above hardware structures may be dynamically adjusted according to hardware resources and a charging requirement. For example, the processor and the memory are integrated into one control chip or one controller for an integrated solution.

That is to say, the charging control method of the present disclosure may be implemented based on the above hardware structures. The charging control method, the charging control device, and the vehicle provided in the present disclosure are described below with reference to the accompanying drawings.

Embodiment I

Figure 4:
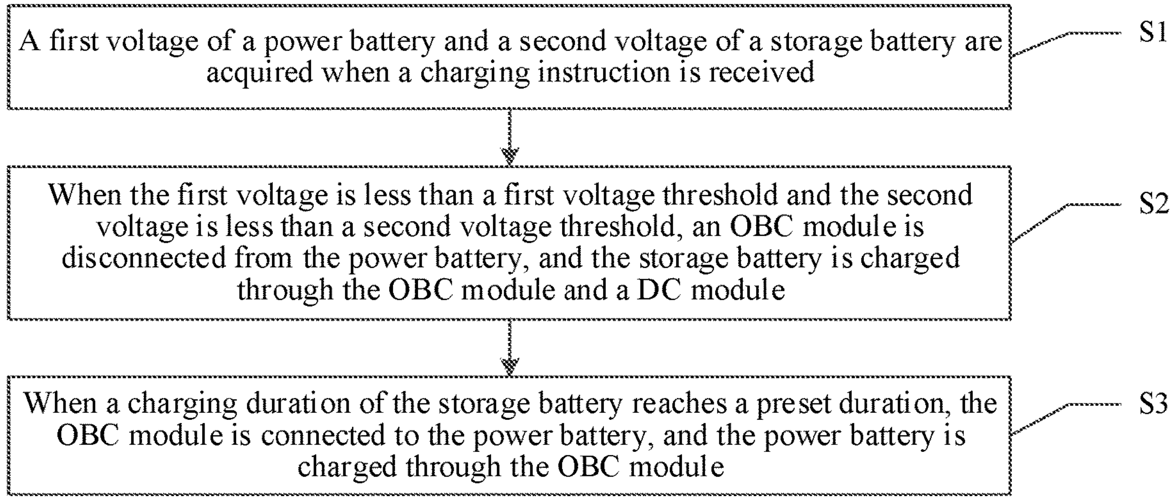
FIG. 4 is a flowchart of a charging control method according to an embodiment of the present disclosure.

FIG. 4 is a flowchart of a charging control method according to an embodiment of the present disclosure. As shown in FIG. 4, the charging control method includes the following steps.

S1: A first voltage of a power battery and a second voltage of a storage battery are acquired when a charging instruction is received.

In this embodiment, when it is detected that a connector of a charging station is inserted into a charging port of a vehicle, the charging instruction is received.

S2: When the first voltage is less than a first voltage threshold and the second voltage is less than a second voltage threshold, an OBC is disconnected from the power battery, and the storage battery is charged through the OBC and a DC.

In this embodiment, in a case that the power battery of a hybrid electric vehicle is in a state of low charge, a condition in which voltages of the power battery and the storage battery are both low occurs when the hybrid electric vehicle is parked in a parking lot and is not used for a long time.

In this embodiment, according to the present disclosure, a switch may be arranged between the OBC and the power battery to realize the disconnection and connection between the OBC and the power battery.

An electric capacity of the storage battery is much less than an electric capacity of the power battery. Therefore, if a fast charging strategy of the power battery is used for charging the storage battery, the storage battery may be damaged and even the whole charging device may fail because a charging voltage and/or a charging current is excessively large. Therefore, in order to ensure the charging safety of the storage battery, in some embodiments, the step of charging the storage battery through the OBC and the DC may include: controlling the OBC to enter a constant voltage mode, and controlling the DC to charge the storage battery in the constant voltage mode.

Figures 5, 6, 7:
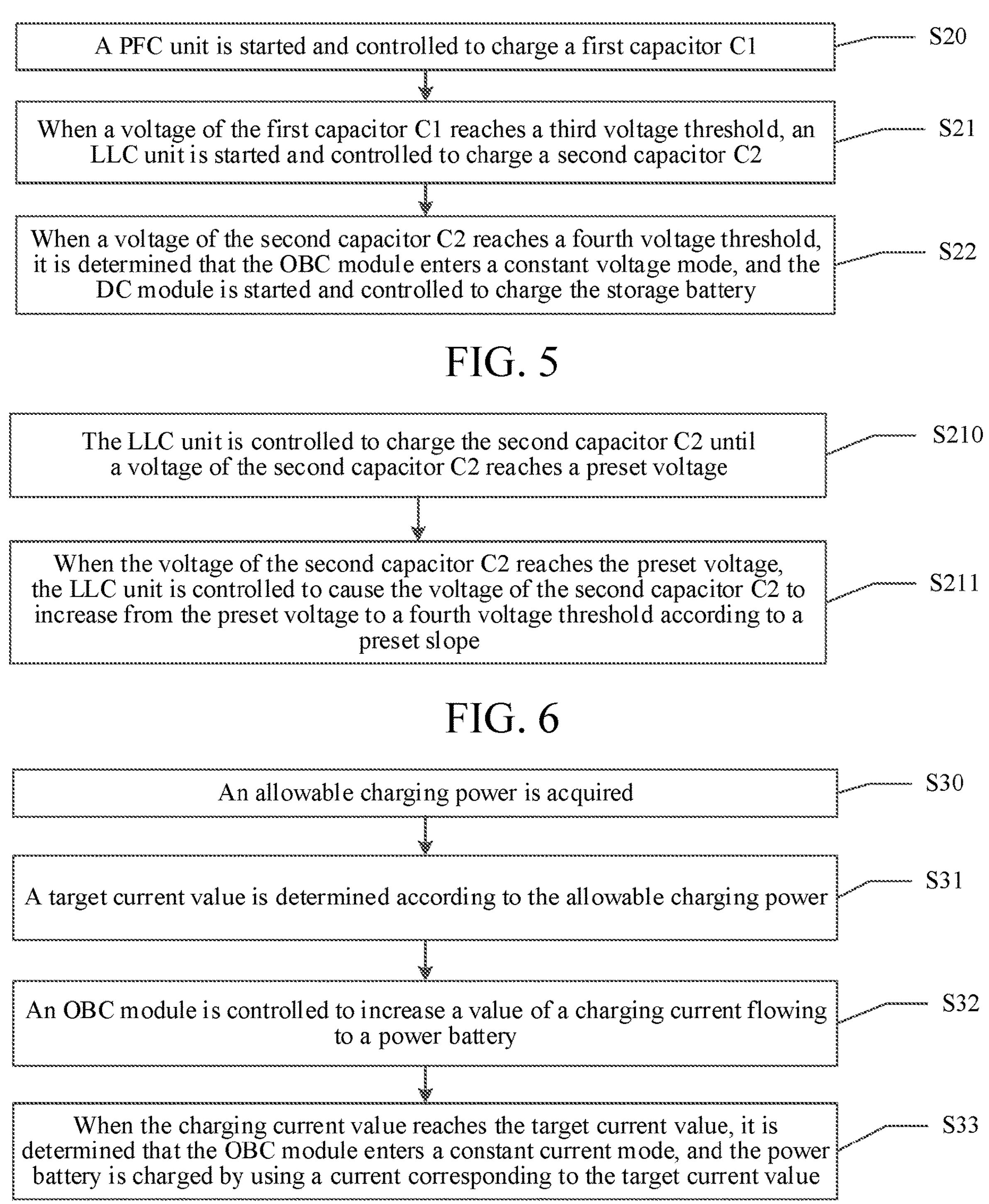
FIG. 5 is a flowchart of charging in a constant voltage mode in a charging control method according to an embodiment of the present disclosure.
FIG. 6 is a flowchart of regular boosting in the constant voltage mode in FIG. 5.
FIG. 7 is a flowchart of charging in a constant current mode in a charging control method according to an embodiment of the present disclosure.

In some embodiments, as shown in FIG. 5, steps of controlling the OBC to enter the constant voltage mode and controlling the DC to charge the storage battery in the constant voltage mode may include the following steps.

S20: The PFC circuit is started and controlled to charge the first capacitor C1.

In this embodiment, in a process of starting and controlling the PFC circuit to charge the first capacitor C1, in order to avoid causing an excessively large instantaneous current flowing through the first capacitor C1 and causing damage to the first capacitor C1 as a result of fast increasing of a charging voltage of the first capacitor C1, the PFC circuit is controlled to cause the charging voltage of the first capacitor C1 to increase from a preset voltage to a third voltage threshold according to a preset slope, which avoids a phenomenon of the excessively large instantaneous current, thereby further improving the charging safety.

It should be noted that the preset voltage in this embodiment may even be 0.

S21: When a voltage of the first capacitor C1 reaches a third voltage threshold, the LLC is started and controlled to charge the second capacitor C2.

In this embodiment, in a process of starting and controlling the LLC to charge the second capacitor C2, in order to avoid an excessively large instantaneous current flowing through the second capacitor C2 and prevent damage to the second capacitor C2 as a result of the excessively fast increasing of the charging voltage of the second capacitor C2, in some embodiments, as shown in FIG. 6, the step of controlling the LLC to charge the second capacitor C2 in the above embodiment includes the following steps.

S210: The LLC is controlled to charge the second capacitor C2 until a voltage of the second capacitor C2 reaches the preset voltage.

In this embodiment, the LLC is first controlled to charge the second capacitor C2, to cause the voltage of the second capacitor C2 to quickly reach the preset voltage, thereby improving the charging efficiency.

S211: When the voltage of the second capacitor C2 reaches the preset voltage, the LLC is controlled to cause the voltage of the second capacitor C2 to increase from the preset voltage to a fourth voltage threshold according to the preset slope.

In this embodiment, a charging voltage of the second capacitor C2 increases from the preset voltage to the fourth voltage threshold according to the preset slope, which avoids the occurrence of the excessively large instantaneous current, thereby further improving the charging safety.

S22: When the voltage of the second capacitor C2 reaches the fourth voltage threshold, it is determined that the OBC enters the constant voltage mode, and the DC is started and controlled to charge the storage battery.

In this embodiment, when the voltage of the first capacitor C1 is stable, the LLC is started and controlled to charge the second capacitor C2. When the voltage of the second capacitor C2 is stable, the DC is started and controlled to charge the battery. In this way, an excessively high charging voltage of the storage battery is avoided, thereby improving the charging safety of the storage battery.

S3: When a charging duration of the storage battery reaches a preset duration, the OBC is connected to the power battery, and the power battery is charged through the OBC.

In the present disclosure, when the voltages of the power battery and the storage battery are both low, the storage battery is first charged for a preset duration, and then the power battery is charged. Therefore, the storage battery can quickly reach a preset voltage, so as to quickly respond to the power demands of all low-voltage loads, which avoids a failure of some functions of the vehicle or even break-down of the vehicle as a result of a start failure caused by the low-voltage loads due to the insufficient power supply voltage of the storage battery, thereby improving the functional safety of the vehicle control.

Due to the excessively large electric capacity of the power battery, in order to meet the requirements of the vehicle owners, the charging duration of the power battery needs to be shortened. Therefore, in order to improve the charging rate of the power battery, in some embodiments, the step of charging the power battery through the OBC in the above embodiment includes: controlling the OBC to enter a constant current mode and charging the power battery in the constant current mode.

In this embodiment, when the power battery is charged, the power battery is charged with a large current. Therefore, the charging duration is shortened, which not only improves the charging rate, but also satisfies the charging demands of the vehicle owners for fast charging.

In some embodiments, as shown in FIG. 7, steps of controlling the OBC to enter a constant current mode and charging the power battery in the constant current mode in the above embodiment are given and include the following step.

S30: An allowable charging power is acquired.

Figures 8, 9, 10:
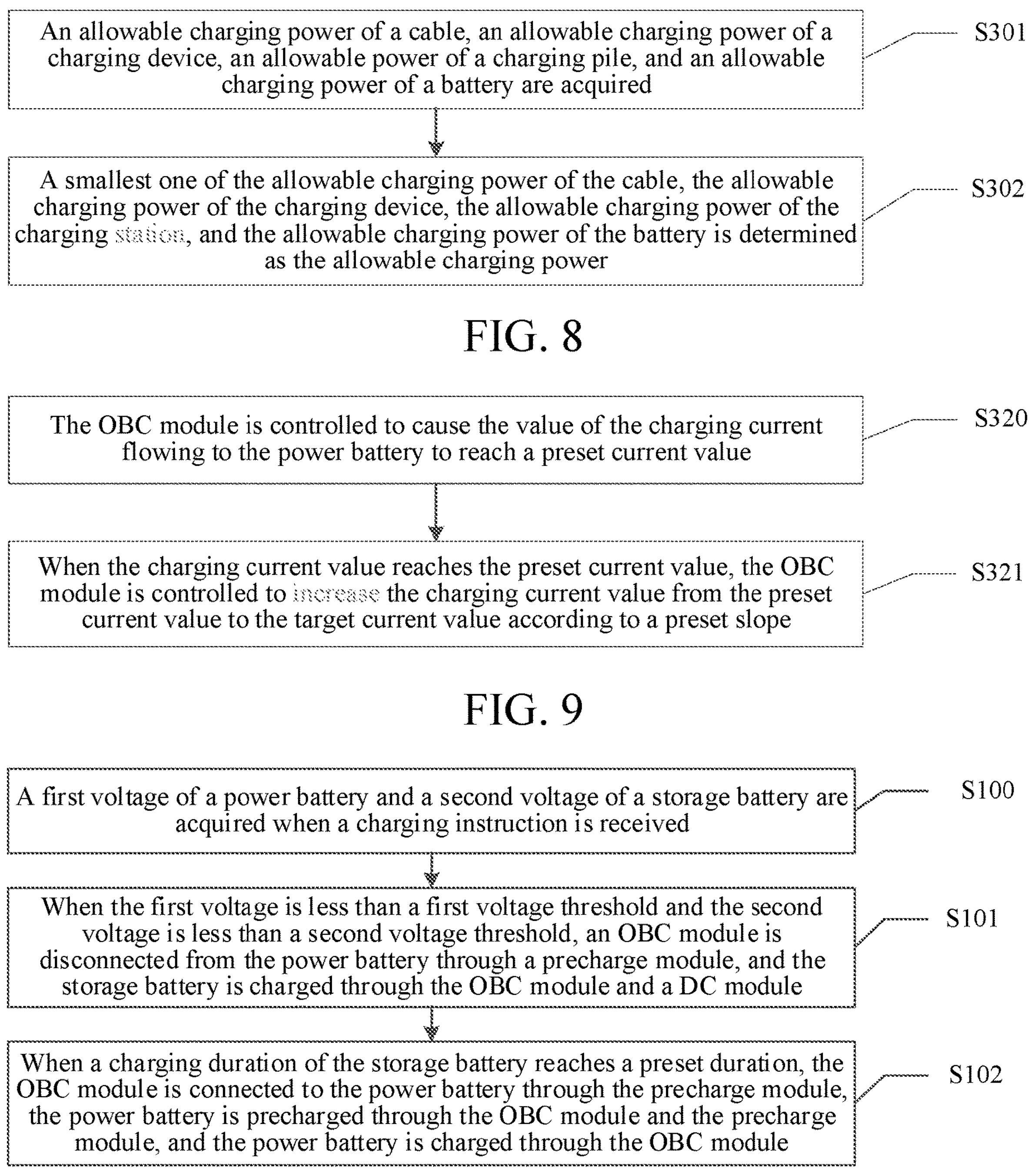
FIG. 8 is a flowchart of acquisition of an allowable charging power during charging in the constant current mode in FIG. 7.
FIG. 9 is a flowchart of regularly increasing a current during charging in the constant current mode in FIG. 7.
FIG. 10 is a flowchart of a charging control method according to another embodiment of the present disclosure.

The charging power of the power battery is not only limited by the power battery, but also limited by the charging device, even limited by the charging station, and the like, which requires comprehensive consideration. Therefore, in some embodiments, as shown in FIG. 8, the step of acquiring the allowable charging power in the above embodiment includes the following steps.

S301: An allowable charging power of a cable, an allowable charging power of a charging device, an allowable power of a charging station, and an allowable charging power of a battery are acquired.

In this implementation, the allowable charging power of the cable is acquired by acquiring a resistance of an AC charging device (for example, a connector), and obtaining an allowable current value according to the resistance and a table of preset standards, for example, in a table of preset standards, 100Ω corresponds to 63 A, 220Ω corresponds to 32 A, 680Ω corresponds to 16 A, and 1.5 KΩ corresponds to 10 A. Then the allowable charging power Pcc of the cable is calculated according to the mains supply voltage and the allowable current value.

In this implementation, the acquisition of the allowable charging power of the charging device is acquired by acquiring a charging control signal PWM according to Chinese national standard of GBT 18487.1-2015, and obtaining a duty cycle D by analyzing the PWM. An allowable current is obtained according to the duty cycle and by presetting the standard meter. For example, charging is not allowed when D<8%, the allowable current Imax=6 when 8%≤D≤10%, the allowable current Imax=D*100*0.6 when 10%≤D<85%, the allowable current Imax=(D*100−64)*2.5 when 85%≤D<90%, and the charging is not allowed when Imax≤63 and 90%≤D. Then the Pcp is calculated according to the mains voltage and the allowable current.

In this implementation, the allowable charging power of the charging station is acquired by acquiring an AC side grid voltage U and an AC side current I, that is, a grid current, and calculating a current charging power Pn according to power P=U*I.

In this implementation, the allowable charging power of the battery is acquired by receiving a Battery Management System (BMS) message to acquire an allowable charging power Pbms of a battery pack of the vehicle.

S302: A smallest one of the allowable charging power of the cable, the allowable charging power of the charging device, the allowable power of the charging station, and the allowable charging power of the battery is determined as the allowable charging power.

In this embodiment, the smallest one of the allowable charging power of the cable, the allowable charging power of the charging device, the allowable charging power of the charging station, and the allowable charging power of the battery is selected as the allowable charging power, which does not exceed the maximum output power of all devices, thereby further improving the charging safety.

S31: A target current value is determined according to the allowable charging power.

S32: The OBC is controlled to increase a value of a charging current flowing to the power battery.

In this embodiment, in a process of controlling the OBC to charge the power battery, in order to avoid damage to the power battery or damage to the related device due to the excessively fast increasing of the charging current of the power battery, as shown in FIG. 9, the step of controlling the OBC to increase the value of the charging current flowing to the power battery in the above embodiment includes the following steps.

S320: The OBC is controlled to cause the value of the charging current flowing to the power battery to reach a preset current value.

In this embodiment, the OBC is first controlled to cause the charging current flowing to the power battery quickly to reach the preset current value, thereby improving the charging efficiency.

S321: When the charging current value reaches the preset current value, the OBC is controlled to increase the charging current value from the preset current value to the target current value according to a preset slope.

In this embodiment, the charging current flowing to the power battery increases from the preset current value to the target current value according to the preset slope, which avoids the phenomenon of the excessively large instantaneous current, thereby further improving the charging safety.

S33: When the charging current value reaches the target current value, it is determined that the OBC enters the constant current mode, and the power battery is charged with a current corresponding to the target current value.

In this embodiment, the OBC is controlled to enter the constant current mode, which not only increases the charging rate of the power battery, but also avoids damage to the power battery and the related charging device due to the excessive increase of the charging current, thereby further improving the charging safety.

Embodiment II

FIG. 10 is a flowchart of a charging control method according to another embodiment of the present disclosure. As shown in FIG. 10, the charging control method includes the following steps.

S100: A first voltage of a power battery and a second voltage of a storage battery are acquired when a charging instruction is received.

Step S100 of this embodiment is the same as step S1 of the above embodiment, and the details are not described herein again.

S101: When the first voltage is less than a first voltage threshold and the second voltage is less than a second voltage threshold, an OBC is disconnected from the power battery through a precharge circuit, and the storage battery is charged through the OBC and a DC.

In this embodiment, the OBC is disconnected from or connected to the power battery by reusing the existing precharge circuit, which not only improves the integration level of the charging device, but also reduces the cost without adding a switch.

In some embodiments, the step of disconnecting the OBC from the power battery through the precharge circuit in the above embodiment includes: controlling a first switch and a second switch to be opened to disconnect the OBC from the power battery.

S102: When a charging duration of the storage battery reaches a preset duration, the OBC is connected to the power battery through the precharge circuit, the power battery is precharged through the OBC and the precharge circuit, and the power battery is charged through the OBC.

In this embodiment, the OBC and the power battery are connected by the precharge circuit, thereby improving the integration level and reducing the cost. In addition, before the power battery is charged, the power battery is precharged through the precharge circuit, to charge the power battery with a large current when the voltage of the power battery matches the voltage of the second capacitor C2, thereby further improving the charging safety of the power battery.

In some embodiments, the step of connecting the OBC to the power battery through the precharge circuit, and precharging the power battery through the OBC and the precharge circuit in the above embodiment includes: controlling the second switch to be closed and keeping the first switch opened, to connect the OBC to the power battery, and precharging the power battery through the OBC and the precharge resistor.

In the present disclosure, when the voltages of the power battery and the storage battery are both low, the storage battery is first charged for a preset duration, and then the power battery is charged. Therefore, the storage battery can quickly reach a preset voltage, so as to quickly respond to the power demands of all low-voltage loads. This avoids a failure of some functions of the vehicle or even break-down of the vehicle as a result of a start failure caused by the low-voltage loads due to the insufficient power supply voltage of the storage battery, thereby improving the functional safety of the vehicle control. In addition, in this embodiment, the precharge circuit is reused to realize the connection or disconnection between the OBC and the power battery, thereby improving the integration level.

A second aspect of the present disclosure provides a charging control device for a hybrid electric vehicle, including a processor and a memory. The processor is connected with the memory, the memory is configured to store a computer program, and the computer program is loaded and executed by the processor to: acquire a first voltage of a power battery and a second voltage of a storage battery when receiving a charging instruction; disconnect an OBC from the power battery and charge the storage battery through the OBC and a DC when the first voltage is less than a first voltage threshold and the second voltage is less than a second voltage threshold; and connect the OBC to the power battery and charge the power battery through the OBC when a charging duration of the storage battery reaches a preset duration.

In an embodiment, the hybrid electric vehicle further includes a precharge circuit. One end of the precharge circuit is connected with the OBC and the DC, and another end of the precharge circuit is connected with the power battery.

The processor is further configured to disconnect the OBC from the power battery through the precharge circuit.

The processor is further configured to connect the OBC to the power battery through the precharge circuit, and precharge the power battery through the OBC and the precharge circuit.

In an embodiment, the precharge circuit includes a first switch, a second switch, and a precharge resistor. The second switch and the precharge resistor are connected in series, and the second switch and the precharge resistor connected in series are connected in parallel with the first switch.

The processor is further configured to control a first switch and a second switch to be opened to disconnect the OBC from the power battery.

The processor is further configured to control the second switch to be closed and keep the first switch opened, to connect the OBC to the power battery, and precharge the power battery through the OBC and the precharge resistor.

In an embodiment, the processor is further configured to control the OBC to enter a constant voltage mode, and control the DC to charge the storage battery in the constant voltage mode.

In an embodiment, the OBC includes a PFC circuit, a first capacitor, an LLC, and a second capacitor connected in sequence. The PFC circuit is connected with the charging port, and the second capacitor is connected with the precharge circuit and the DC.

The processor is further configured to: start and control the PFC circuit to charge the first capacitor; start and control the LLC when a voltage of the first capacitor reaches a third voltage threshold, to charge the second capacitor; and determine that the OBC enters the constant voltage mode, and start and control the DC to charge the storage battery when a voltage of the second capacitor reaches a fourth voltage threshold.

In an embodiment, the processor is further configured to: control the LLC to charge the second capacitor until the voltage of the second capacitor reaches a preset voltage; and control the LLC when the voltage of the second capacitor reaches the preset voltage, to increase the voltage of the second capacitor from the preset voltage to the fourth voltage threshold according to a preset slope.

In an embodiment, the processor is further configured to: control the OBC to enter a constant current mode and charge the power battery in the constant current mode.

In an embodiment, the processor is further configured to: acquire an allowable charging power; determine a target current value according to the allowable charging power; control the OBC to increase a value of a charging current flowing to the power battery; and determine that the OBC enters the constant current mode and charge the power battery with a current corresponding to the target current value when the charging current value reaches the target current value.

In an embodiment, the processor is further configured to: acquire an allowable charging power of a cable, an allowable charging power of a charging device, an allowable power of a charging station, and an allowable charging power of a battery; and determine a smallest one of the allowable charging power of the cable, the allowable charging power of the charging device, the allowable power of the charging station, and the allowable charging power of the battery as the allowable charging power.

In an embodiment, the processor is further configured to: control the OBC, to cause the value of the charging current flowing to the power battery to reach a preset current value; and control the OBC when the charging current value reaches the preset current value, to increase the charging current value from the preset current value to the target current value according to a preset slope.

The principles and implementations of the charging control device provided in the embodiment of the present disclosure are similar to those in the above embodiments, and the details are not described herein again.

A third aspect of the present disclosure provides a vehicle, including a charging control device for a hybrid electric vehicle described in the above embodiments.

The principles and implementations of the charging control device provided in the embodiment of the present disclosure are similar to those in the above embodiments, and the details are not described herein again.

In the description of the present disclosure, it should be understood that orientation or position relationships indicated by the terms such as “center”, “longitudinal”, “transverse”, “length”, “width”, “thickness”, “on”, “below”, “front”, “back”, “left”, “right”, “vertical”, “horizontal”, “top”, “bottom”, “inside”, “outside”, “axial direction”, “radial direction”, and “circumferential direction” are based on orientation or position relationships shown in the accompanying drawings, and are used only for ease and brevity of illustration and description, rather than indicating or implying that the mentioned apparatus or component must have a particular orientation or must be constructed and operated in a particular orientation. Therefore, such terms should not be construed as a limitation on the present disclosure.

In the description of the present disclosure, it should be noted that, unless otherwise explicitly specified or defined, the terms such as “mount”, “connect”, and “connection” should be understood in a broad sense. For example, the connection may be a fixed connection, a detachable connection, or an integral connection; or the connection may be a direct connection, an indirect connection through an intermediary, or internal communication between two components. A person of ordinary skill in the art may understand the specific meanings of the foregoing terms in the present disclosure according to specific situations.

In the descriptions of this specification, the description of reference terms such as “one embodiment”, “some embodiments”, “an exemplary embodiment”, “an example”, “a specific example”, or “some examples” means that specific features, structures, materials, or characteristics described in combination with the embodiment or examples are included in at least one embodiment or example of the present disclosure. In this specification, schematic descriptions of the foregoing terms do not necessarily mean the same embodiment or example.

Although the embodiments of the present disclosure have been shown and described, a person of ordinary skill in the art should understand that various changes, modifications, replacements, and variations may be made to the embodiments without departing from the principle and spirit of the present disclosure, and the scope of the present disclosure is defined by the claims and their equivalents.

What is claimed is:

1. A method for charging control of a hybrid electric vehicle, wherein the hybrid electric vehicle comprises a precharge circuit, a charging port, an On Board Charger (OBC), a power battery, a DC-DC converter (DC), and a storage battery; a first end of the OBC is connected with the charging port; a second end of the OBC is connected with a first end of the power battery and a first end of the DC; and a second end of the DC is connected with the storage battery, wherein the OBC comprises a Power Factor Correction (PFC) circuit, a first capacitor, an inductances-capacitor resonant converter (LLC), and a second capacitor connected in sequence; the PFC circuit is connected with the charging port; and the second capacitor is connected with the precharge circuit and the DC; and the method comprises:

receiving a charging instruction;

acquiring a first voltage of the power battery and a second voltage of the storage battery in response to receiving the charging instruction;

determining whether the first voltage is less than a first voltage threshold and the second voltage is less than a second voltage threshold;

in response to determining that the first voltage is less than the first voltage threshold and the second voltage is less than the second voltage threshold, disconnecting the OBC from the power battery, and charging the storage battery through the OBC and the DC for a charging duration by:

starting the PFC circuit to charge the first capacitor;

in response to that a voltage of the first capacitor reaches a third voltage threshold, starting the LLC to charge the second capacitor; and in response to that a voltage of the second capacitor reaches a fourth voltage threshold, determining that the OBC enters a constant voltage mode and starting the DC to charge the storage battery; and in response to that the charging duration of the storage battery reaches a duration threshold, connecting the OBC to the power battery and charging the power battery through the OBC.

2. The method according to claim 1, wherein a first end of the precharge circuit is connected with the OBC and the DC; and a second end of the precharge circuit is connected with the power battery;

the disconnecting the OBC from the power battery comprises: disconnecting the OBC from the power battery through the precharge circuit; and the connecting the OBC to the power battery comprises: connecting the OBC to the power battery through the precharge circuit, and precharging the power battery through the OBC and the precharge circuit.

3. The method according to claim 2, wherein the precharge circuit comprises a first switch, a second switch, and a precharge resistor; the second switch and the precharge resistor are connected in series; and the second switch and the precharge resistor connected in series are connected in parallel with the first switch;

the disconnecting the OBC from the power battery through the precharge circuit comprises: disconnecting the OBC from the power battery by opening the first switch and the second switch; and the connecting the OBC to the power battery through the precharge circuit, and precharging the power battery through the OBC and the precharge circuit comprises: connecting the OBC to the power battery and precharging the power battery through the OBC and the precharge resistor by closing the second switch and keeping the first switch open.

4. The method according to claim 1, wherein the starting the LLC to charge the second capacitor comprises:

charging the second capacitor by the LLC until the voltage of the second capacitor reaches a preset voltage; and in response to that the voltage of the second capacitor reaches the preset voltage, increasing, by the LLC, the voltage of the second capacitor from the preset voltage to the fourth voltage threshold according to a preset slope.

5. The method according to claim 1, wherein the charging the power battery through the OBC comprises:

controlling the OBC to enter a constant current mode and charging the power battery in the constant current mode.

6. The method according to claim 5, wherein the controlling the OBC to enter the constant current mode and charging the power battery in the constant current mode comprises:

acquiring an allowable charging power;

determining a value of a target current according to the allowable charging power;

increasing, by the OBC, a value of a charging current flowing to the power battery; and in response to that the value of the charging current flowing to the power battery reaches the value of the target current, determining that the OBC enters the constant current mode and charging the power battery with the target current.

7. The method according to claim 6, wherein the acquiring the allowable charging power comprises:

acquiring an allowable charging power of a cable, an allowable charging power of a charging device, an allowable power of a charging station, and an allowable charging power of a battery; and determining a smallest one of the allowable charging power of the cable, the allowable charging power of the charging device, the allowable power of the charging station, and the allowable charging power of the battery as the allowable charging power.

8. The method according to claim 6, wherein the increasing, by the OBC, the value of the charging current flowing to the power battery comprises:

increasing, by the OBC, the value of the charging current flowing to the power battery to reach a preset current value; and in response to that the value of the charging current reaches the preset current value, increasing, by the OBC, the value of the charging current from the preset current value to the value of the target current according to a preset slope.

9. A device for charging control of a hybrid electric vehicle, comprising:

a processor; and a memory, wherein the memory is configured to store a computer program, and the computer program is executable by the processor to perform operations comprising:

receiving a charging instruction;

acquiring a first voltage of a power battery and a second voltage of a storage battery in response to receiving the charging instruction;

determining whether the first voltage is less than a first voltage threshold and the second voltage is less than a second voltage threshold;

in response to determining that the first voltage is less than the first voltage threshold and the second voltage is less than the second voltage threshold, disconnecting an On Board Charger (OBC) from the power battery and charging the storage battery through the OBC and a DC-DC converter (DC) for a charging duration, wherein: the OBC comprises a Power Factor Correction (PFC) circuit, a first capacitor, an inductances-capacitor resonant converter (LLC), and a second capacitor connected in sequence; the PFC circuit is connected with a charging port of the hybrid electric vehicle, and the second capacitor is connected with a precharge circuit of the hybrid electric vehicle and the DC; and the charging the storage battery through the OBC and the DC for the charging duration comprises:

starting the PFC circuit to charge the first capacitor;

in response to that a voltage of the first capacitor reaches a third voltage threshold, starting the LLC to charge the second capacitor; and in response to that a voltage of the second capacitor reaches a fourth voltage threshold, determining that the OBC enters a constant voltage mode and starting the DC to charge the storage battery; and in response to that the charging duration of the storage battery reaches a duration threshold, connecting the OBC to the power battery and charging the power battery through the OBC.

10. The device according to claim 9, wherein a first end of the precharge circuit is connected with the OBC and the DC; and a second end of the precharge circuit is connected with the power battery; and the operations further comprise:

disconnecting the OBC from the power battery through the precharge circuit; and connecting the OBC to the power battery through the precharge circuit, and precharging the power battery through the OBC and the precharge circuit.

11. The device according to claim 10, wherein the precharge circuit comprises a first switch, a second switch, and a precharge resistor; the second switch and the precharge resistor are connected in series; and the second switch and the precharge resistor connected in series are connected in parallel with the first switch; and the operations further comprise:

disconnecting the OBC from the power battery by opening the first switch and the second switch; and connecting the OBC to the power battery and precharging the power battery through the OBC and the precharging resistor by closing the second switch and keeping the first switch open.

12. The device according to claim 10, wherein the operations further comprise:

controlling the OBC to enter the constant voltage mode, and charging the storage battery by the DC in the constant voltage mode.

13. The device according to claim 9, wherein the operations further comprise:

charging the second capacitor by the LLC until the voltage of the second capacitor reaches a preset voltage; and in response to that the voltage of the second capacitor reaches the preset voltage, increasing, by the LLC, the voltage of the second capacitor from the preset voltage to the fourth voltage threshold according to a preset slope.

14. The device according to claim 9, wherein the operations further comprise:

controlling the OBC to enter a constant current mode and charging the power battery in the constant current mode.

15. The device according to claim 14, wherein the operations further comprise:

acquiring an allowable charging power;

determining a value of a target current according to the allowable charging power;

increasing, by the OBC, a value of a charging current flowing to the power battery; and in response to that the value of the charging current flowing to the power battery reaches the value of the target current, determining that the OBC enters the constant current mode and charging the power battery with the target current.

16. The device according to claim 15, wherein the operations further comprise:

acquiring an allowable charging power of a cable, an allowable charging power of a charging device, an allowable power of a charging station, and an allowable charging power of a battery; and determining a smallest one of the allowable charging power of the cable, the allowable charging power of the charging device, the allowable power of the charging station, and the allowable charging power of the battery as the allowable charging power.

17. A vehicle, comprising a device for charging control of the vehicle, the device comprising a processor and a memory, wherein the memory is configured to store a computer program, and the processor is configured to execute the computer program to perform operations comprising:

receiving a charging instruction;

acquiring a first voltage of a power battery and a second voltage of a storage battery in response to receiving the charging instruction;

determining whether the first voltage is less than a first voltage threshold and the second voltage is less than a second voltage threshold;

in response to determining that the first voltage is less than the first voltage threshold and the second voltage is less than the second voltage threshold, disconnecting an On Board Charger (OBC) from the power battery and charging the storage battery through the OBC and a DC-DC converter (DC) for a charging duration, wherein: the OBC comprises a Power Factor Correction (PFC) circuit, a first capacitor, an inductances-capacitor resonant converter (LLC), and a second capacitor connected in sequence; the PFC circuit is connected with a charging port of the vehicle, and the second capacitor is connected with a precharge circuit of the vehicle and the DC; and the charging the storage battery through the OBC and the DC for the charging duration comprises:

starting the PFC circuit to charge the first capacitor;

in response to that a voltage of the first capacitor reaches a third voltage threshold, starting the LLC to charge the second capacitor; and in response to that a voltage of the second capacitor reaches a fourth voltage threshold, determining that the OBC enters a constant voltage mode and starting the DC to charge the storage battery; and in response to that the charging duration of the storage battery reaches a duration threshold, connecting the OBC to the power battery and charging the power battery through the OBC.

* * * * *